United States Patent Office 3,845,006
Patented Oct. 29, 1974

3,845,006
AMINORESIN-SILICA MICROCOMPOSITES
Modesto Erneta, Princeton Junction, N.J., assignor to NL Industries, Inc., New York, N.Y.
No Drawing. Filed May 7, 1973, Ser. No. 358,035
Int. Cl. C08g 51/04
U.S. Cl. 260—37 N
9 Claims

ABSTRACT OF THE DISCLOSURE

Spheroidal shaped particles of silica-aminoresin polymeric composites have been produced which possess particles having a range from $1\mu$ to $50\mu$. The composites contain from 40% to 99% silica, the remainder being an aminoresin. The particles are more or less spheroidal in shape and appear to have large holes where the spheres have collapsed. These compositions are useful in films and paper coatings.

BACKGROUND OF THE INVENTION

Various types of microspheres or microcapsules have been produced for a variety of uses. Among those which are related to the product of the instant invention are urea-formaldehyde micro-particles having individual particle sizes ranging from $0.05\mu$ to $0.1\mu$ which are formed as loosely adherent clusters having a cluster size from $1\mu$ to $10\mu$. Such products have been suggested for use as opacifying agents for paint, paper and the like. These products have been used with limited success.

SUMMARY OF THE INVENTION

Spheroidal shaped particles of silica-aminoresin polymeric composites have been prepared. These particles have an average size range from $1\mu$ to $50\mu$ with a surface area range from 10 to 300 m.$^2$/g. The composites have a composition of 40% to 99% silica, the remainder being the aminoresin. These particles appear to have been formed first as spheres which upon drying formed holes in the side walls of the sphere. The dried products appear as spheroidal particles having collapsed side walls.

DESCRIPTION OF THE PREFERRED EMBODIMENTS

The amino resins used in the instant invention include amino-formaldehyde condensation products of urea, melamine, aniline, guanidine and thiourea. These aminoresins are formed and polymerized in the presence of polysilicic acid which upon drying forms silica-aminoresin polymerized composite. The amounts of the amino group and the formaldehyde employed should be from 0.5 to 2.0 moles of formaldehyde for each part of the amino group used.

In preparing these compositions the following general procedure is employed:

A solution of polysilicic acid is placed in a container and with agitation, a solution of a prepolymer of an amino-formaldehyde resin is then added to the polysilicic acid solution.

The mixture is then preferably spray dried at elevated temperatures to form the spheroidal shaped polymerized composites of silica and aminoresin. If spray drying is not used, the mixture is heated to 50° C. to boiling to polymerize the composite and the precipitated product is removed.

It has been found that the amount of silica present in the composite should fall within the range of 40% to 99%, the remainder being the aminoresin. All of the percentages are expressed on a weight basis. When the products are used for opacification in paper, the composite should contain silica in the amounts specified to produce superior hiding in the paper product.

The composite particles produced have been found to contain a surface area which falls within the range of from 10 to 300 m.$^2$/g.

In order to describe the instant invention in more detail, the following examples are presented:

Example 1

This example is presented to show the preparation of highly uniform silica-amino resin microspheres containing 69% silica, 23% urea formaldehyde, and 8% water. (75% silica and 25% urea formaldehyde on a dry basis) all of the percentages expressed on a weight basis.

1360 lbs. of an aqueous solution of polysilicic acid with a SiO$_2$ content of 5.5% by weight were placed in a container and agitated vigorously.

To this solution were added 38.5 lbs. of an aqueous solution of urea formaldehyde resin containing 65% by weight solids.

This solution was then pumped to a spray dryer. The spray dryer operated with an air inlet of 700° F. and with an air outlet of 200° F. The product was collected at the bottom of the dryer as a white free flowing powdery material. This material was comprised of spheroidal hollow particles having a particle size range of $5\mu$ to $40\mu$ with a surface area of 270 m.$^2$/gm. and a bulk density of .6 gm./cc. A particle analysis shows the particles contained by weight 69% SiO$_2$, 23% urea formaldehyde, and 8% H$_2$O. The operational details are recorded in the table.

When 5% by weight of these particles were used in conjunction with 5% by weight of TiO$_2$ in a paper composition, it was found that the bulk density of the paper decreased with only a slight decrease in opacity over similar paper which contained 10% pigment by weight of TiO$_2$.

Instead of spray drying the mixture may be heated from 50° C. to boiling to precipitate and polymerize the composition if desired.

Examples 2-3

These examples are presented to show varying weight ratios of SiO$_2$ to urea formaldehyde. In Example 2, the dry product contained 95.4% by weight SiO$_2$ and 4.6% by weight urea formaldehyde. In Example 3 the percent by weights were 47.6% SiO$_2$ and 52.4% urea formaldehyde (the percentages express on a dry weight basis).

The operational details are recorded in the table.

Examples 4-5

These examples are presented to show a product which contained amino resins other than urea formaldehyde. Melamine formaldehyde was used in Example 4, and thiourea formaldehyde was used in Example 5. The operational details are recorded in the table.

When the products of Examples 2-5 were used in paper along with TiO$_2$ (5% spheroidal particles and 5% TiO$_2$), the bulk density of the paper decreased with only a slight decrease in opacity when compared to paper which contained 10% TiO$_2$.

While this invention has been described and illustrated by the examples shown, it is not intended to be strictly limited thereto, and other variations and modifications may be employed within the scope of the following claims:

aminoresin, said aminoresin being amino-formaldehyde and containing 0.5–2.0 moles of formaldehyde for each

TABLE

| Example | 1 | 2 | 3 | 4 | 5 |
|---|---|---|---|---|---|
| Percent by weight SiO$_2$* | 75 | 95.4 | 47.6 | 75.5 | 75. |
| Percent by weight amino resin * | 25 | 4.6 | 52.4 | 24.5 | 25. |
| Type of amino resin | Urea formaldehyde. | Urea formaldehyde. | Urea formaldehyde. | Melamine formaldehyde. | Thiourea formaldehyde. |
| Amt. of polysilicic acid solution (lb.) | 1,360 | 8.8 | 16.30 | 6.6 | 6.6. |
| Percent by weight SiO$_2$ in polysilicic acid | 5.5 | 4 | 4 | 4 | 5. |
| Amt. amino resin solution (lb.) | 38.5 | .026 | 1.10 | .441 | .97. |
| Percent solids in amino resin solution | 65 | 65 | 65 | 19.4 | 11.33. |
| Air inlet (° F.) | 700 | 410 | 446 | 392 | 410. |
| Air outlet (° F.) | 200 | 232 | 232 | 194 | 203. |
| Particle range ($\mu$) | 5–40 | 2–20 | 2–20 | 3–20 | 2–14. |
| Surface area (m$^2$/gm.) | 270 | | | | |
| Bulk density (gm./cc.) | .6 | | .5 | | |

* On a dry basis.

What is claimed is:

1. A copolymerized composite comprising polysilicic acid and polymeric aminoresin; said composite having a particle size range from 1$\mu$ to 50$\mu$; said copolymerized composite containing from 40% to 99% of polysilicic acid, calculated as silica by weight, the remainder being the aminoresin polymer, said aminoresin polymer containing 0.5–2.0 moles of formaldehyde for each mole of amino employed.

2. Composition according to Claim 1 in which the aminoresin is urea formaldehyde.

3. Composition according to Claim 1 in which the aminoresin is melamine formaldehyde.

4. Composition according to Claim 1 in which the aminoresin is thiourea formaldehyde.

5. Process for producing a copolymerized composite of aminoresin and polysilicic acid which comprises admixing an aqueous solution of an aminoresin prepolymer and a water solution of polysilicic acid and heating the mixture to 50° C. to boiling to form a copolymerized composite of said prepolymer and said polysilicic acid and recovering said copolymerized composite therefrom, the amount of polysilicic acid employed being from 40% to 99% of the mixture, calculated as SiO$_2$, the remainder being the aminoresin, said aminoresin being amino-formaldehyde and containing 0.5–2.0 moles of formaldehyde for each mole of amino employed, said copolymerized composite produced having a particle size range from 1$\mu$ to 50$\mu$.

6. Process according to Claim 5 in which the aminoresin is urea formaldehyde.

7. Process according to Claim 5 in which the aminoresin used is melamine formaldehyde.

8. Process according to Claim 5 in which the aminoresin used is thiourea formaldehyde.

9. Process according to Claim 5 in which the copolymerized composition is formed by spray drying the mixture of said prepolymer and said polysilicic acid.

References Cited
UNITED STATES PATENTS

| 3,251,800 | 5/1966 | Cooley et al. | 260—39 SB |
| 3,714,085 | 1/1973 | Berstein et al. | 260—39 SB |
| 2,408,654 | 10/1946 | Kirk | 106—287 X S |

MORRIS LIEBMAN, Primary Examiner

E. S. PARR, Assistant Examiner

U.S. Cl. X.R.

106—198, 287 S, 308 N; 260—39 SB